(12) United States Patent
Friedmann

(10) Patent No.: US 7,207,232 B2
(45) Date of Patent: Apr. 24, 2007

(54) CONTINUOUSLY VARIABLE TRANSMISSION, AND A TRANSFER CASE INCLUDING A CONTINUOUSLY VARIABLE TRANSMISSION

(75) Inventor: Oswald Friedmann, Lichtenau (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 249 days.

(21) Appl. No.: 10/888,090

(22) Filed: Jul. 9, 2004

(65) Prior Publication Data

US 2005/0096162 A1 May 5, 2005

(30) Foreign Application Priority Data

Jul. 17, 2003 (DE) .................. 103 32 369

(51) Int. Cl.
- F16H 35/02 (2006.01)
- F16H 35/06 (2006.01)
- F16H 35/08 (2006.01)
- F16H 7/08 (2006.01)
- F16H 7/22 (2006.01)

(52) U.S. Cl. ................. 74/393; 74/395; 474/109
(58) Field of Classification Search ........... 74/393, 74/395–399; 474/18, 109, 110
See application file for complete search history.

(56) References Cited

U.S. PATENT DOCUMENTS

| 3,240,078 | A | * | 3/1966 | Newell | 476/11 |
| 3,789,676 | A | * | 2/1974 | Brems | 74/27 |
| 4,299,582 | A | * | 11/1981 | Leitner | 474/109 |
| 4,644,822 | A | * | 2/1987 | Batchelor | 475/204 |
| 4,862,845 | A | * | 9/1989 | Butterfield et al. | 123/90.15 |
| 5,425,680 | A | * | 6/1995 | Young | 474/111 |
| 5,967,696 | A | * | 10/1999 | Allen et al. | 404/112 |
| 6,327,926 | B1 | | 12/2001 | Chilman | 74/117 |
| 2006/0025280 | A1 | * | 2/2006 | Bassler et al. | 476/42 |

FOREIGN PATENT DOCUMENTS

DE 200 11 649 U 1 11/2000

* cited by examiner

Primary Examiner—Tisha Lewis
(74) Attorney, Agent, or Firm—Alfred J. Mangels

(57) ABSTRACT

A continuously variable transmission including a drive element rotatable about a drive axis, an output element rotatable about an output axis parallel to the drive axis, and an adjusting mechanism with which the drive axis and the output axis can be laterally offset from each other. Coupling elements operate between the drive element and the output element and are spaced from each other in the peripheral direction of the drive element and output element for transmitting torque between the elements. The coupling elements change the movement of a peripheral region of the drive element faster than that of the output element so that forces acting on the coupling elements from the drive element and the output element lie substantially in a common plane that extends perpendicularly to the axes of rotation. The continuously variable transmission can be incorporated into a transfer case for an all-wheel drive system.

11 Claims, 4 Drawing Sheets

CONTINUOUSLY VARIABLE TRANSMISSION, AND A TRANSFER CASE INCLUDING A CONTINUOUSLY VARIABLE TRANSMISSION

BACKGROUND OF THE INVENTION

1. Field of the Invention

The present invention relates to a continuously variable transmission as well as to a transfer case that includes a continuously variable transmission.

2. Description of the Related Art

FIG. 5 shows a known drive train of an all-wheel-drive motor vehicle. An internal combustion engine 10 is connected through a transmission 12, for example a gearbox, to a transfer case 14 from which an output shaft 16 leads to a drive shaft 18, which is connected to a rear axle differential 20. A further output shaft 22 extends from transfer case 14 and is connected through a further shaft 24 to a front axle differential 26. Such drive trains are known in the most varied configurations.

For various reasons, particularly vehicle movement dynamics reasons, it is advisable to divide the output torque of the transmission 12 to the wheels of the rear axle and the wheels of the front axle according to the driving condition in various ways. That can be accomplished by means of clutches, planetary gear sets, and differentials interconnected in various ways. One possibility consists also in integrating a continuously variable transmission (a transmission having a continuously variable transmission ratio) into the transfer case 14, whose transmission ratio can be changed within a limited range in such a way that according to the operating conditions the wheels of the front axle rotate slightly faster or slightly slower than those of the rear axle.

A continuously variable transmission that can be utilized in such a transfer case is described, for example, in German Patent Publication No. DE 200 11 649 U1. The transmission includes a disk converter and a planetary gear set, which are coupled to each other in such a way that one of three main parts of the planetary gear set is controlled in a continuously variable way by the disk converter, a second part is coupled to the driven shaft of the transmission, and a third part is coupled to an output shaft of the transmission. The disk converter includes a drum as a driving component and a crowned disk as a driven component. The crowned disk has pins that each engage a groove of an associated intermediate disk. Each of the axially adjacent intermediate disks is connected to a radially inner surface of the drum through a one-way clutch. By an eccentric displacement between the drum and the crowned disk, the rotational speed ratio between the drum and the crowned disk can be modified. The known disk converter is relatively complicated in its configuration and has relatively large space requirements.

A continuously variable transmission that has a disk-shaped input element and an output element is known from U.S. Pat. No. 6,327,926. The input element has a radially-inwardly-open annular groove within which coupling elements move, which are each designed with a projecting pin whose enlarged end is received in a corresponding radially-extending groove of the output element. The rotational speed ratio between the input element and the output element changes by an eccentric displacement between the two. The elements have a relatively complex design. Furthermore, the axially-extending pins of the coupling elements must have a high rigidity because they are subjected to bending stresses.

It is an object of the invention to produce a continuously variable transmission that can particularly be used in transfer cases and can be economically manufactured with a compact design.

SUMMARY OF THE INVENTION

The object of the invention is achieved with a continuously variable transmission that includes a drive element that is rotatable about a drive axis, an output element that is rotatable about an output axis A that is parallel to the drive axis, an adjustment mechanism with which the distance between the drive axis and the output axis can be changed, and spaced coupling elements operating between the drive element and the output element in the peripheral direction of the drive element and the output element for transmitting torque. The coupling elements block a displacement of the corresponding peripheral region of the drive element faster than that of the output element, whereby the forces engaging the coupling elements of the drive element and the output element lie approximately in a common plane that is perpendicular to the axes of rotation.

The drive element is advantageously formed with mutually circumferentially-spaced drive projections arranged concentrically relative to the drive axis, which project into an annular groove that is arranged on the drive element concentrically relative to the output axis and which interact with the coupling elements arranged in the annular groove.

In a preferred embodiment of the continuously variable transmission, the coupling elements are composed of two radially adjacent coupling bodies that form an included angle somewhat smaller than 180° in the direction of rotation of the drive element and the output element, that have radially opposite surfaces that lie on the radially inner wall and the radially outer wall of the annular groove, and that together support each other through their mutually facing sides.

The mutually facing sides of the coupling bodies advantageously form rolling surfaces that roll on each other when there is a change in the angle between the coupling bodies.

The coupling bodies of the coupling elements are biased in the direction of an extended position.

In a preferred embodiment of a continuously variable transmission in accordance with the invention, the coupling bodies are formed with noses on the side opposite to the direction of rotation of the drive element and of the output element in the region of their mutually facing ends, against which rest the drive projections of the drive element.

The drive projections are preferably constructed having a thickness that diminishes radially inwardly when viewed in section perpendicular to the axes of rotation, and on their side opposite to the direction of rotation lie abut a leaf spring that biases the coupling bodies in an extended position direction.

The lateral surfaces of the drive projections that face in the direction of rotation preferably run approximately radially relative to the drive axis.

A transfer case that, as described above, includes a continuously variable transmission in accordance with the invention, advantageously has an input shaft supported in a transmission housing, within which the output element is also supported, in which a bracket can be pivoted about the bearing axis of the input shaft, on which the drive element of the continuously variable transmission is supported.

A drive gear of the transfer case is advantageously arranged on the same axis as the drive shaft and is non-rotatably connected therewith, an output gear is arranged on the same axis as the drive element and is non-rotatably connected therewith, and the drive gear and the output gear are connected to each other by means of an endless torque-transmitting means.

The continuously variable transmission in accordance with the invention can be installed with advantage wherever a compactly-built transmission with continuously variable transmission ratio and small spread is needed.

The transfer case in accordance with the invention has a very compact structure, if needed for the endless torque-transmitting means, a simply-designed tension regulating unit, since the spacing between the drive gear and the output gear does not change with a transmission ratio adjustment of the continuously variable transmission, and operates smoothly and uniformly, since numerous drive projections with coupling elements arranged between them can be provided without difficulty.

BRIEF DESCRIPTION OF THE DRAWINGS

The invention will be explained below in exemplary fashion with reference to the schematic drawings and with further details, wherein.

DESCRIPTION OF THE PREFERRED EMBODIMENTS

Figure 1:
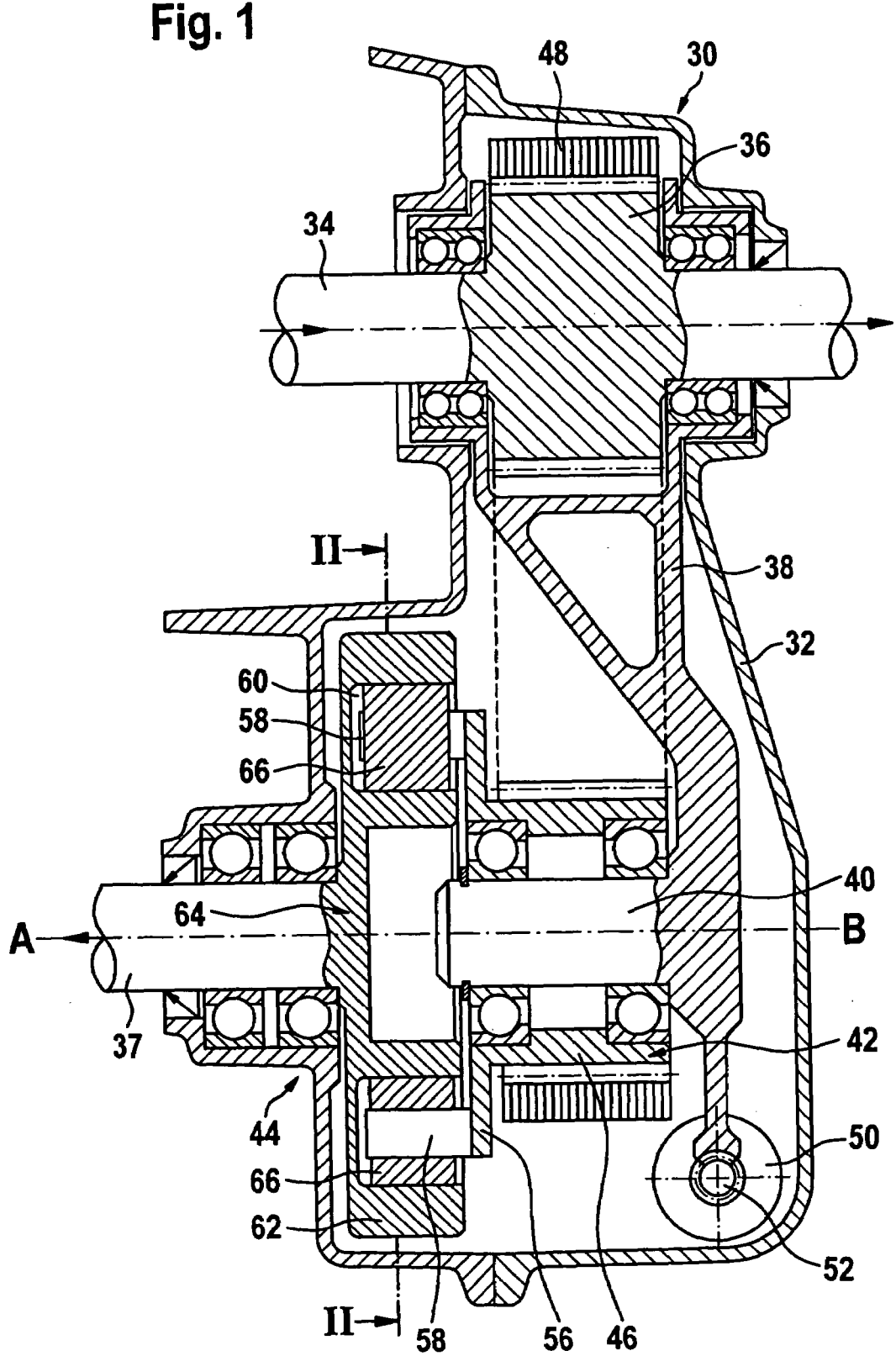
FIG. 1 is a longitudinal section through a transfer case with an integrated continuously variable transmission.
Figure 5:
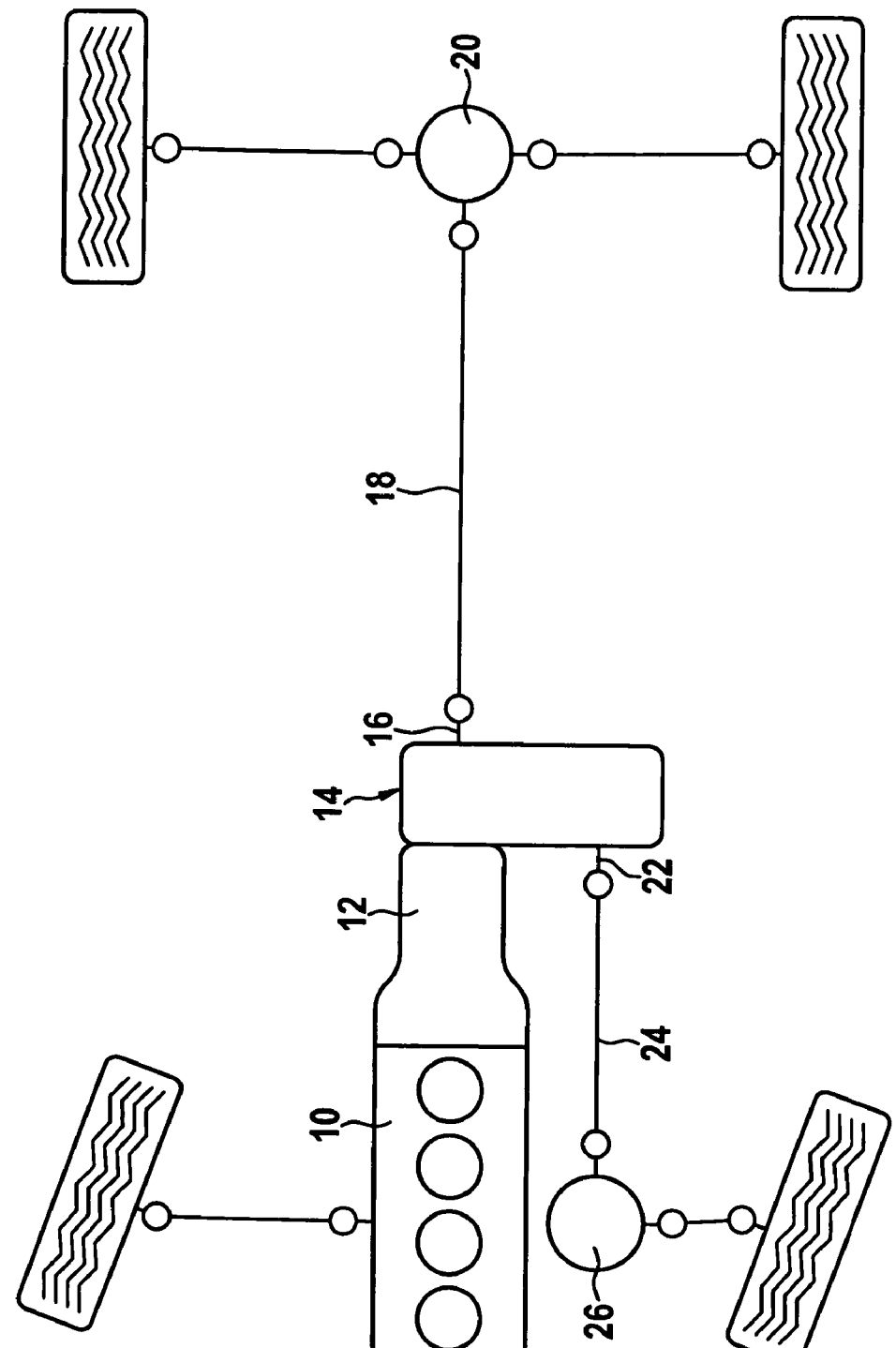
FIG. 5 is a view of a known drive train of an all-wheel-drive motor vehicle.

In accordance with FIG. 1, a transfer case identified overall by reference numeral 30 has a housing 32, in which an input shaft 34 passing through the housing is supported, which in accordance with FIG. 1 is connected on the left side to the transmission 12 (FIG. 5), and on the right side forms the output shaft 16 in accordance with FIG. 1. The input shaft 34 is configured as one piece with a drive gear 36.

An output shaft 37 is rotatably supported in the housing 32 about an output axis A spaced radially from the drive shaft 34.

A bracket 38 having a bearing pin 40 on which is supported a drive element 42 of a continuously variable transmission, identified overall by reference numeral 44, is pivotably supported on the same axis as the input shaft 34. In the view of FIG. 1, the axis of the bearing pin 40 and the axis A of the output shaft 37 lie on the same straight line. The drive element 42 has a tubular body that is supported on the bearing pin 40 and forms an output gear 46 relative to the drive gear 36, whereby an endless torque-transmitting means 48, for example a toothed belt, passes around the drive gear 36 and the output gear 46.

By mounting the bracket 38 on the same axis as the input shaft 34 or the drive gear 36, the result is that if the bracket 38 is pivoted, the distance between the output gear 46 and the drive gear 36 does not change, so that the length of the endless torque-transmitting means 48 also does not change. An electric motor 50 that drives a spindle 52, for example, which engages with a corresponding thread formed at an end of the bracket 38, is provided for pivoting the bracket 38.

The body of the drive element 42 that forms the output gear 46 is rigidly connected to, or is formed as one piece with, an annular disk 56, and is coaxial with the axis of rotation B of the drive element 42 from which circularly-arranged, peripherally-spaced drive projections 58 extend. Drive projections 58 extend into an annular groove 60 that is formed on an annular disk 62 that is rigidly connected to the output shaft 37, or is formed as one piece therewith. The annular disk 62 together with the output shaft 37 forms an output element of the continuously variable transmission 44 identified overall by reference numeral 64.

Coupling elements 66 are arranged in the annular groove 60 between each two peripherally adjacent drive projections 58.

Figure 2:
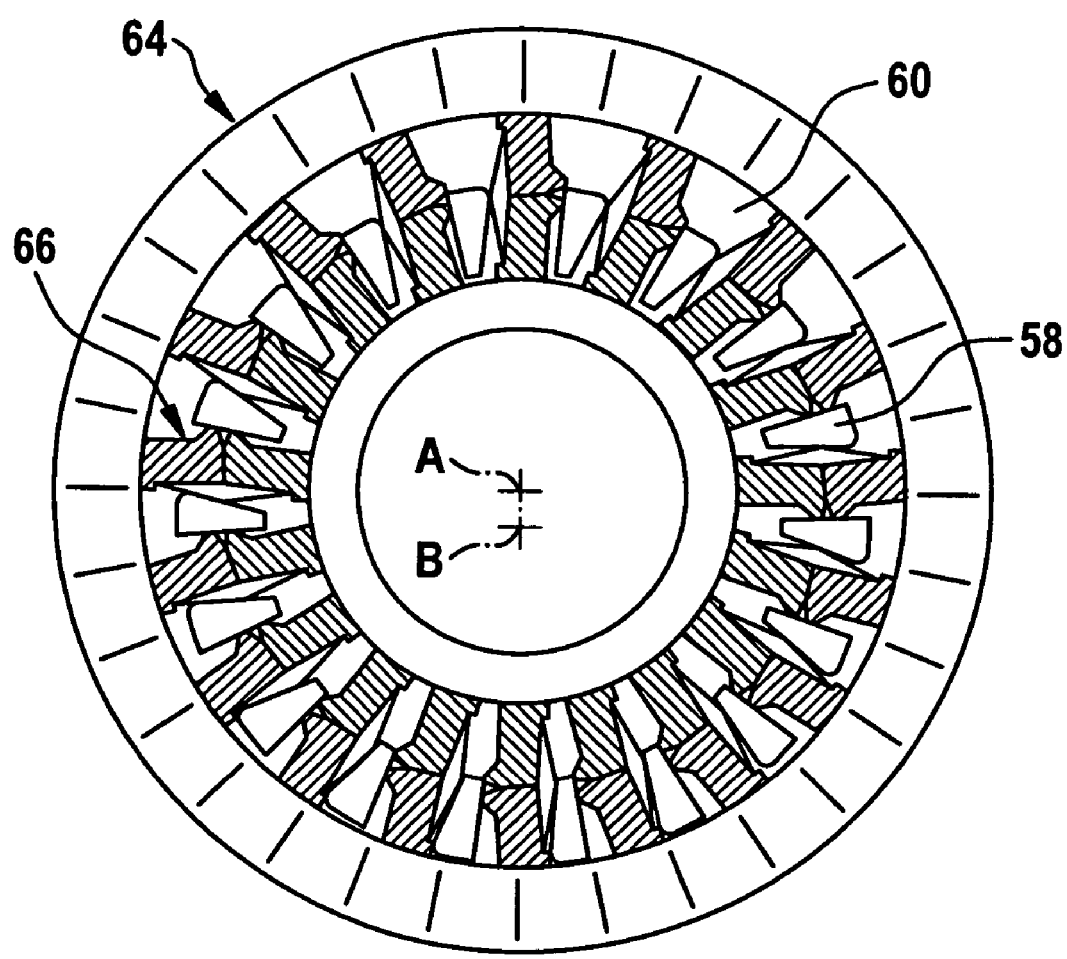
FIG. 2 is an end elevational view of a drive element as viewed from the right in FIG. 1 with the drive projections shown in section.
Figure 3:
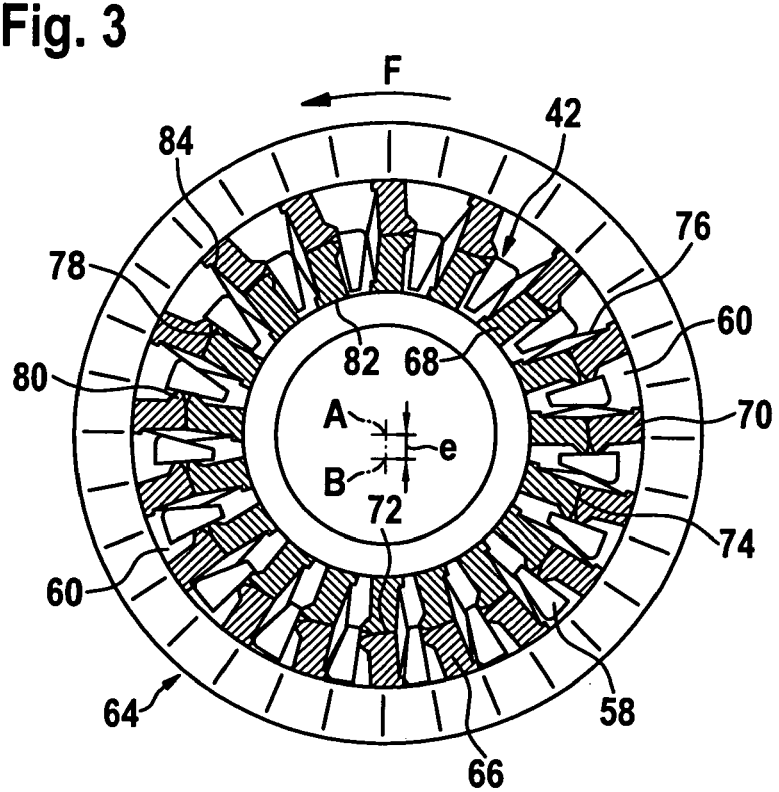
FIG. 3 is an enlarged representation of FIG. 2.

As best seen in FIGS. 2 and 3, each coupling element 66 is composed of a radially inner coupling portion 68 and a radially outer coupling portion 70, which are oppositely arranged through crowned rolling surfaces 72 and 74, and with reference to the counterclockwise direction relative to FIG. 3, which is the direction of rotation of the components of the continuously variable transmission, form an angle of somewhat less than 180° with each other and are thus therefore not completely in an extended direction. The lateral surfaces of the coupling portions 68 and 70 that face in the direction of rotation are respectively radially outwardly or radially inwardly recessed in which a leaf spring 76 is supported that biases the coupling portions 68 and 70 in the direction of an extended position. The lateral surfaces of the coupling portions 68, 70 that face away from the direction of rotation are provided with noses 78 and 80 on their mutually facing end regions, against which lie the drive projections 58.

The drive projections 58 have a wedge shape in a section perpendicular to the axis of rotation B, wherein their thickness diminishes radially inwardly. The lateral surfaces of the drive projections 58 that face the noses 78 and 80 run in an approximately radial direction relative to the axis of rotation of the drive element 42. As shown, the arrangement is such that each drive projection 58 lies against the noses 78 and 80 of the coupling portions of a coupling element and the leaf spring 76 of an adjacent coupling element, and a radially inner contact surface 82 of the radially inner coupling portion 68 rests on the radially inner wall of the annular groove 60, and a radially outer contact surface 84 of the radially outer coupling portion 70 rests on the outer annular wall of the annular groove 60.

With the described arrangement, a transmission of torque from the drive projections 58 of the drive element 42 is achieved through the coupling elements 66 onto the walls of the annular groove 60 of the output element 64 in a plane II—II (see FIG. 1), that is perpendicular to the axes of rotation A and B.

Figure 4:
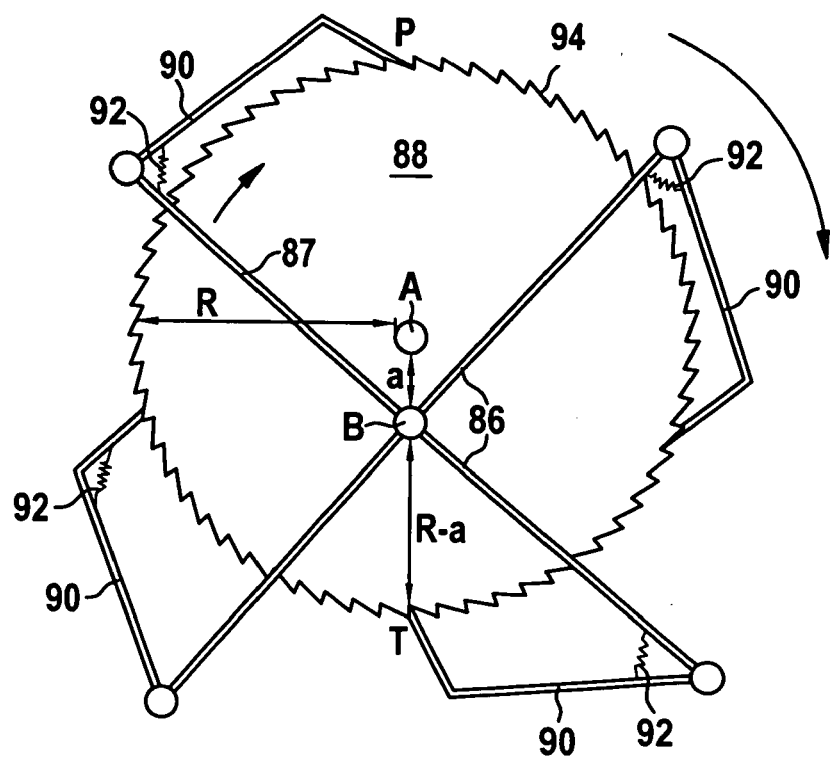
FIG. 4 is a schematic for explaining the functional principle of the continuously variable transmission in accordance with the invention.

The function of the described continuously variable transmission formed substantially by the components 42, 64, and 66 is explained first in principle with reference to FIG. 4, in which crossed arms 86 are rigidly connected with each other and form a drive element 87 rotatable about the axis of rotation B, a wheel 88 provided with external teeth is supported for rotation about an axis A, and coupling elements 90 are pivotally supported at the outer ends of the arms 86 and are respectively pulled in the clockwise direction by means of springs 92, that is, in the direction toward the arms 86. The coupling elements 90 are bent at their ends and engage the tooth system 94, wherein the tooth system is formed in such a way that a coupling element 90 cannot move in a clockwise direction relative to the tooth system, but the tooth system can move clockwise relative to a coupling element.

It is initially assumed that the axes of rotation A and B coincide. If the drive element 87 composed of the arms 86 is driven in a clockwise direction, all the arms 90 that are arranged symmetrically with reference to the wheel 88 take along the tooth system 92, so that the wheel 88 rotates at the same rotational speed as the component formed by the arms 86. If the axis B of the drive component 87 is displaced relative to the axis A by the dimension a (shown in FIG. 4), the effective radius for the engagement of the upper clutch elements 90 shown in FIG. 4, whose distance from the axis of rotation B is a maximum, is equal to R+a, wherein R is the radius of the wheel 88. The effective radius for the engagement between the tooth system 94 and the lower clutch elements 90 relative to its peripheral speed, amounts to R−a. Therewith, the peripheral speed of the upper engagement (P) in accordance with FIG. 4 is ω(a+R) when the rotational speed of the component composed of the arms 92 is ω, whereas the peripheral speed of the lower clutch elements 90 is merely ω(R−a) when they engage tooth system 94. The tooth system 94, and therewith the wheel 88, are consequently driven by the respective upper coupling elements 90 at a peripheral speed that is greater than the peripheral speed of the other coupling elements, so that those lag behind relative to the tooth system 94. The rotational speed of the wheel 88 is increased by the factor R/R−a relative to the position at which axes B and A coincide.

The foregoing considerations can be transferred directly to the continuously variable transmission 44 if the drive element 42 is thought of as equivalent to drive element 87, coupling elements 90 are equivalent to the coupling elements 66, and the wheel 88 is equivalent to the output element 64. If the axis A of the output element 64 coincides with the axis B of the drive element 42, the drive projections 58 of the drive element 42, which are wedge-shaped in cross section, are in a radial position in such a way that they are accommodated approximately in the region of their half thickness between noses 78 and 80 and the crowns of the leaf springs 76, wherein the individual components are in mutual contact over the entire periphery. If the drive element 42, and therewith the drive projections 58 in accordance with FIG. 3, are rotated counterclockwise (arrow F), the coupling portions 68 and 70 are additionally pushed in the direction of their extended position by the force applied to their noses, so that they are additionally pushed against the peripheral walls of the annular groove 60 and carry along the output element 64, so that when axes A and B coincide the output element 64 rotates at the same rotational speed as the drive element.

If the output element 64 lags behind relative to the drive element 42, that is, if the annular groove moves with a slower peripheral speed than the drive element 42, then the coupling portions 68 and 70 are pressed into increasing contact, whereby the engagement between the coupling portions and the walls of the annular groove is reinforced, so that a very high torque can be transmitted in the counterclockwise direction from the drive element 42 to the output element 64. The torque transfer capacity in the opposite direction is considerably smaller, because the coupling portions 68 and 70 are pressed, by the friction force against the walls of the annular groove 60, against the force of the leaf springs in the direction against the extended position when they overtake the annular groove 60 in a clockwise direction, whereby the friction force is reduced.

If the drive element 42 is displaced into an eccentric position relative to the output element 64 by pivoting of the bracket 38, outwardly from the plane of the drawing in accordance with FIG. 1, which corresponds to a horizontal movement in accordance with the view of FIGS. 2 and 3, which for clarity is shown as a perpendicular movement, the upper drive projections 58 move downward, relative to FIG. 3, so that an additional force is exerted on the noses 78 and 80 and the leaf springs 75 as a result of the increasing thickness of the drive projections, which increasingly prestresses the coupling portions 68 and 70 into the extended direction, whereas the lower drive projections 58, relative to FIG. 3, press the coupling portions 68 and 70 with a reduced force into an extended position. Consequently, the engagement between the upper coupling portions, relative to FIG. 3, and the output element 64 is reinforced, so that the output element 64 is driven in its upper region at an effective radius r+e, when r is the effective radius of the drive element in a concentric position between the output element and the drive element. The rotational speed of output element 64 consequently increases relative to the concentric position in the ratio (r+e)/r. In its lower region, or outside the uppermost region, the output element 64, or its annular groove, can overtake the coupling portions 68 and 70, as explained above.

Consequently, the invention provides a compactly-designed transfer case with integrated continuously variable transmission, wherein the rotational speed of the output element 64 relative to the drive element 42 can be transformed in accordance with the effective radius r and the maximum possible eccentricity e into, for example, up to a 15% higher speed. By appropriately selecting the diameter of the drive gear 36 and the output gear 46, or also by coordinating the front axle differential therewith, the overall transmission ratio of the front axle relative to the rear axle can be transformed into a slower speed. If, for example, one selects the fixed transmission ratio of the front axle as 0.95, then one can achieve an overall transmission ratio of 0.95–1.05 between the front axle and the rear axle with a transmission ratio of the continuously variable transmission of 1.0–1.1, so that the torque delivered to the front axle can amount to between 0 and 100% of the overall torque.

The described stepless transmission, in a modified design of the overall transmission, can be arranged parallel to a fixed planetary distributor between the front and rear axles. Further, a simple clutch can be arranged in series with the continuously variable transmission, which can be disengaged if the ABS system is activated, to improve the control of the rotational speeds of the wheels by the ABS control unit. That clutch can also be mechanically operated if the continuously stepless transmission is in its 1:1 position.

The invention can be modified in many ways. For example, the torque can be transmitted between the drive projections 58 of the drive element, and the annular groove 60 of the output element by other coupling elements than those described as two coupling portions that roll on each other, and which are known in numerous embodiments as unilaterally acting freewheeling elements.

The following claims are illustrative and are without prejudice to acquiring wider patent protection. The applicants reserve the right to claim additional combinations of features disclosed in the specification and/or drawings.

The references contained in the dependent claims point to further developments of the object of the main claim by means of the features of the particular claim; they are not to be construed as a renunciation of independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations in accordance with the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps.

What is claimed is:

1. A continuously variable transmission comprising: a drive element rotatable about a first, drive axis; an output element rotatable about a second, output axis that is parallel to the first, drive axis; an adjustment device for changing a lateral spacing between the first, drive axis and the second, output axis; and coupling elements for transmitting torque and operative between the drive element and the output element and spaced from each other in a circumferential direction, which coupling elements block motion in one peripheral region of the drive element faster than that of the output element, whereby engagement forces acting on the coupling elements from the drive element and the output element lie substantially in a common plane extending perpendicular to the first and second axes.

2. A continuously variable transmission in accordance with claim 1, wherein the drive element includes a plurality of circumferentially spaced drive projections arranged concentrically with respect to the first, drive axis; wherein the output element includes an annular groove arranged concentric with respect to the second, output axis in which the coupling elements are disposed and into which the drive projections extend to operatively interact with the coupling elements.

3. A continuously variable transmission in accordance with claim 2, wherein the coupling elements include two coupling portions arranged radially end-to-end and that together form an included angle less than 180° in a rotation direction of the drive element and the output element, wherein radially oppositely facing surfaces of the coupling portions engage respective radial inner and radial outer walls of the annular groove, and wherein mutually facing end surfaces of the coupling portions are in end-to-end engagement.

4. A continuously variable transmission in accordance with claim 3, wherein the mutually facing ends of the coupling portions include rolling surfaces that roll against each other when the included angle between the coupling portions changes.

5. A continuously variable transmission in accordance with claim 3, wherein the coupling portions of the coupling elements are biased toward an extended position.

6. A continuously variable transmission in accordance with claim 3, wherein the coupling portions include adjacent their mutually facing ends respective noses on sides opposite to a direction of rotation of the drive element and the output element, and that are in contact with the drive projections of the drive element.

7. A continuously variable transmission in accordance with claim 6, wherein the drive projections have a radially-inwardly-diminishing thickness in a cross section taken perpendicular to the second, output axis, and on a side opposite to the direction of rotation of the drive element they engage a leaf spring that acts against the coupling portions to bias the coupling portions toward an extended direction.

8. A continuously variable transmission in accordance with claim 7, wherein lateral surfaces of the drive projections that face in the direction of rotation of the drive element extend substantially radially relative to the first, drive axis.

9. A transfer case comprising: a housing; an input shaft rotatably carried by the housing; an output shaft rotatably carried by the housing and having an axis offset from the input shaft axis; and a continuously variable transmission positioned within the housing and operatively connected with the input shaft and the output shaft, wherein the continuously variable transmission includes: a drive element rotatable about a first, drive axis; an output element rotatable about a second, output axis that is parallel to the first, drive axis; an adjustment device for changing a lateral spacing between the first, drive axis and the second, output axis; and coupling elements for transmitting torque and operative between the drive element and the output element and spaced from each other in a circumferential direction, which coupling elements block motion in one peripheral region of the drive element faster than that of the output element, whereby engagement forces acting on the coupling elements from the drive element and the output element lie substantially in a common plane extending perpendicular to the first and second axes; and a bracket that is pivotably carried on the input shaft and that supports an input drive element that is operatively connected with an output element operatively connected with the output shaft.

10. A transfer case in accordance with claim 9, including a drive gear non-rotatably carried on the input shaft; and an output gear non-rotatably carried by the output element, wherein the drive gear and the output gear are operatively interconnected by an endless torque-transmitting means.

11. A transfer case comprising: a housing; an input shaft rotatably carried by the housing; an output shaft rotatably carried by the housing and having an axis offset from the input shaft axis; a continuously variable transmission positioned within the housing and operatively connected with the input shaft and the output shaft; wherein the continuously variable transmission includes a bracket that is pivotably carried on the input shaft and that supports an input drive element that is operatively connected with an output element operatively connected with the output shaft, wherein the operative connection between the output element and the output shaft includes a drive element rotatable about a first, drive axis; a second output element rotatable about a second, output axis that is parallel to the first, drive axis; an adjustment device for changing a lateral spacing between the first, drive axis and the second, output axis; and coupling elements for transmitting torque and operative between the drive element and the second output element and spaced from each other in a circumferential direction, which coupling elements block motion in one peripheral region of the drive element faster than that of the second output element, whereby engagement forces acting on the coupling elements from the drive element and the second output element lie substantially in a common plane extending perpendicular to the first and second axes.

* * * * *